(12) United States Patent  (10) Patent No.: US 8,286,221 B2
Muller et al.  (45) Date of Patent: Oct. 9, 2012

(54) SECURITY ARCHITECTURE

(75) Inventors: Thomas Muller, Bochum (DE); Martin Roter, Bochum (DE)

(73) Assignee: Nokia Corporation, Espoo (FI)

( * ) Notice: Subject to any disclaimer, the term of this patent is extended or adjusted under 35 U.S.C. 154(b) by 810 days.

(21) Appl. No.: 11/275,964

(22) Filed: Feb. 7, 2006

(65) Prior Publication Data

US 2006/0143466 A1 Jun. 29, 2006

Related U.S. Application Data

(62) Division of application No. 09/588,003, filed on Jun. 6, 2000.

(30) Foreign Application Priority Data

Jun. 7, 1999 (GB) .................................. 9913195.5

(51) Int. Cl.
H04L 29/06 (2006.01)

(52) U.S. Cl. ......... 726/2; 726/3; 726/4; 726/5; 713/151; 713/152; 713/150; 709/225; 709/223; 455/403; 455/410

(58) Field of Classification Search ........................ None
See application file for complete search history.

(56) References Cited

U.S. PATENT DOCUMENTS

| | | | |
|---|---|---|---|
| 5,163,147 A | | 11/1992 | Orita |
| 5,577,209 A | * | 11/1996 | Boyle et al. ........................ 726/4 |
| 5,818,936 A | | 10/1998 | Mashayekhi |
| 5,953,528 A | * | 9/1999 | Sullivan ........................ 717/165 |
| 6,731,625 B1 | * | 5/2004 | Eastep et al. .................. 370/352 |
| 6,754,713 B1 | * | 6/2004 | Dascalu ........................ 709/229 |
| 6,957,342 B2 | * | 10/2005 | Vatanen ........................ 713/192 |
| 7,345,681 B2 | * | 3/2008 | Mehrotra et al. ............. 345/179 |
| 7,428,404 B2 | * | 9/2008 | Kawaguchi ................... 455/11.1 |
| 7,650,409 B2 | * | 1/2010 | Cain et al. ....................... 709/225 |
| 7,773,972 B2 | * | 8/2010 | Croome et al. ............... 455/411 |
| 7,809,003 B2 | * | 10/2010 | Makela ........................... 370/401 |
| 7,917,758 B2 | * | 3/2011 | Palekar et al. ................. 713/171 |
| 7,944,355 B2 | * | 5/2011 | Kumar et al. ............... 340/572.1 |

(Continued)

FOREIGN PATENT DOCUMENTS

JP 10 124459 A 5/1998

(Continued)

OTHER PUBLICATIONS

A Systematic Review of File Sharing in Mobile Devices Using Peer-To-Peer Systems Waheed Yasin, Hamidah Ibrahim, Nor Asila Wati Abdul Hamid, Nur Izura Udzir. Computer and Information Science. Toronto: Jan. 2011. vol. 4, Iss. 1; p. 28, 14 pgs.*
J. Haartsen, "Bluetooth—The Universal Radio Interface for Ad Hoc Wireless Connectivity", Ericsson Review, Volume No. 3, 1998 pp. 110-117, XP000783249 ISSN: 0014-0171 and Abstract.
J. Haartsen, et al., "Bluetooth: Vision, Goals, and Architecture Mobile Computing and Communications Review", U.S. ACME New York, NY, vol. 2, No. 4, Oct. 1, 1998, pp. 38-45, XP000784002 and Abstract.

(Continued)

Primary Examiner — Syed A. Zia
(74) Attorney, Agent, or Firm — Banner & Witcoff, Ltd.

(57) ABSTRACT

A device for communicating with other devices to allow them to access applications, comprises: at least a first application; authentication means for authenticating a communicating device; and access control means accessible by a communicating device requesting access to the first application without the communicating device having been authenticated by the authentication means. The device is further arranged to arbitrate whether access of the communicating device to the first application is granted or refused wherein if the arbitration requires an authentication of the communicating device, the access control means instructs the authentication means to authenticate the communicating device.

24 Claims, 7 Drawing Sheets

U.S. PATENT DOCUMENTS

| | | | | |
|---|---|---|---|---|
| 8,180,904 | B1 * | 5/2012 | Albanese et al. | 709/228 |
| 8,181,262 | B2 * | 5/2012 | Cooper et al. | 726/28 |
| 2012/0188993 | A1 * | 7/2012 | Calhoun et al. | 370/338 |

FOREIGN PATENT DOCUMENTS

| | | |
|---|---|---|
| JP | 11031129 | 2/1999 |
| WO | 9900958 | 1/1999 |
| WO | 9945454 | 9/1999 |
| WO | 0056105 | 9/2000 |

OTHER PUBLICATIONS

International Search Report for PCT/FI00/00223, Aug. 7, 2000.

Office Action in related Japanese Application No. 2001-502275, dated Jul. 8, 2010, pp. 1-2, English translation pp. 1-3.

Office Action in related U.S. Appl. No. 09/588,003, filed Jul. 20, 2010.

Notification of Ground of Rejection in JP2001-502275 dated Feb. 7, 2012, with partial English translation.

* cited by examiner

SERVICE DATABASE 122

| MULTIPLEXING ID | OPEN (YES / NO) | ENCRYPT (YES / NO) |
|---|---|---|
| $118_1$ | NO | YES |
| $118_2$ | YES | - |
| $118_3$ | NO | NO |

FIG. 7a

DEVICE DATABASE 124

| BLUETOOTH ID | TRUSTED (YES / NO) | LINK KEY | PREVIOUS AUTHENTICATION IN SESSION (YES / NO) |
|---|---|---|---|
| A | YES | $L_A$ | |
| B | NO | $L_B$ | NO |
| C | YES | | |
| D | NO | $L_D$ | YES |

FIG. 7b

AUTHENTICATION

SECURITY MANAGER

SECURITY ARCHITECTURE

This application is a divisional of U.S. patent application Ser. No. 09/588,003 filed Jun. 6, 2000, which claims priority from GB Patent No 2,350,971 filed Jun. 7, 1999, both of which are incorporated herein by reference in their entirety.

BACKGROUND OF THE INVENTION

The present invention relates to the provision of improved security in a device which has services accessible by other devices communicating with the device. It particularly relates to devices which are accessed over a radio interface in accordance with the BLUETOOTH specification (a digital wireless protocol).

FIG. 1 illustrates a network 2 of radio transceiver units, including a master unit 4 and slave units 6, 8 and 10, communicating by transmitting and receiving radio packets. There is only one master in a network. The network operates in a time division duplex fashion. The transceiver units are synchronized to a common time frame determined by the master unit 4. This time frame consists of a series of time slots of equal length. Each radio packet transmitted in the network has its start aligned with the start of a slot and a single packet is transmitted in the network at a time. When the master unit is performing point-to-point communication a transmitted radio packet is addressed to a particular transceiver which replies to the master unit by transmitting a radio packet addressed to the master unit in the next available time slot. When the master unit is performing point to multi-point communication a transmitted radio packet is addressed to all transceiver units. Any time misalignment between the master and a slave is corrected by adjusting the timing of the slave.

The transceivers transmit and receive, in this example, in a microwave frequency band, illustratively 2.4 GHz. The network reduces interference by changing the frequency at which each radio packet is transmitted. A number of separate frequency channels are assigned each with a bandwidth of 1 MHz, and the frequency may hop at a rate of 1600 hops/s. The frequency hopping of the transceivers communicating in or joining the network is synchronized and controlled by the master unit. The sequence of hopping frequencies is unique for the network and is determined by a unique identification of the master unit.

Each transceiver unit has a unique identification, the Unit ID, henceforth referred to as the BLUETOOTH ID. Each BLUETOOTH ID (48-bit IEEE address) is unique for each BLUETOOTH unit. A BLUETOOTH ID of a unit can be found through an enquiry routine over the RF interface to the unit.

The network is a radio frequency network suitable for transmitting voice information or data information between transceivers. The transmissions made are of low power, for example 0 to 20 dBm, and the transceiver units can effectively communicate over the range of a few centimeters to a few tens or hundred of meters.

Referring to FIG. 2, a frame 20 is illustrated. This frame 20 is the common time frame used by the network 2 and controlled by the master unit 4. The frame illustratively has slots 22 to 29. The slots designated by even numbers are reserved. Only the master unit can begin transmitting a radio packet aligned with the start of the even numbered slots. The slots designated by odd numbers are reserved. Only radio packets transmitted by a slave, that is radio packets addressed for reception by the master unit can have their start aligned with the start of the odd numbered slots. Each slot is allocated a different one of a sequence of hopping frequencies. It is however, possible for a radio packet to extend over a number of slots and in this case the frequency at which the packet is transmitted remains constant at that allocated to the slot at the start of the packet. A slot has a constant time period and is typically 625 microseconds.

Referring to FIG. 3, a typical radio packet 30 is illustrated. The radio packet has a start 32 and contains three distinct portions: a first portion contains an Access Code 34, a second portion contains a Header 36 and a third portion contains a Payload 38. The Payload 38 has a Payload Header 37.

Referring to FIG. 4, a schematic illustration of a transceiver unit is shown. Only as many functional blocks and interconnections are shown in this diagram as are necessary to explain in the following how a transceiver unit and the communication network operates. The transceiver unit 40 contains a number of functional elements including: an antenna 46, receiver 50, synchronizer 52, header decoder 54, controller 60, memory 56, packetizer 42, clock 68, frequency hop controller 48 and transmitter 44. Although these elements are shown as separate elements they may in fact be integrated together and may be carried out in software or in hardware.

Data to be transmitted in the payload of a packet by the transceiver unit 40 is supplied as data signal 41 to the packetizer 42. Control information to be transmitted in the payload of a packet is supplied in a payload control signal 87 provided by the controller 60 to the packetizer 42. The packetizer 42 also receives an access code control signal 69 and a header control signal 71 from controller 60 which respectively control the Access Code 34 and the Header 36 attached to the payload to form the packet. The packetizer 42 places the data or control information into a packet 30 which is supplied as signal 43 to the transmitter 44. The transmitter 44 modulates a carrier wave in dependence upon the signal 43 to produce the transmitted signal 45 supplied to the antenna 46 for transmission. The frequency of the carrier wave is controlled to be one of a sequence of hop frequencies by a transmission frequency control signal 47 supplied by the frequency hop controller 48 to the transmitter 44.

The antenna 46 receives a radio signal 51 and supplies it to the receiver 50 which demodulates the radio signal 51 under the control of a reception frequency control signal 49 supplied by the frequency controller 48 to produce a digital signal 53. The digital signal 53 is supplied to the synchronizer 52 which synchronizes the transceiver unit 40 to the time frame of the network. The synchronizer is supplied with an access code signal 81 specifying the Access Code of the packet which the transceiver unit is expecting to receive. The synchronizer accepts those received radio packets with Access Codes which correspond to the expected Access Codes and rejects those received radio packets with Access Codes that do not correspond to the expected Access Code. A sliding correlation is used to identify the presence and the start of the expected Access Code in a radio packet. If the radio packet is accepted then the radio packet is supplied to the header decoder 54 as signal 55 and a confirmation signal 79 is returned to the controller 60 indicating that the packet has been accepted by the synchronizer 52. The confirmation signal 79 is used by the controller in a slave unit to resynchronize the slave clock to the master clock. The controller compares the time at which a radio packet was received with the time at which the radio packet was expected to be received and shifts its timing to offset the difference. The header decoder 54 decodes the header in the received packet and supplies it to the controller 60 as header signal 75. The header decoder 54, when enabled by a payload acceptance signal 77 supplied by the controller 60, produces a data output signal 57 containing the remainder of the radio packet, the payload 38.

The memory 56 may store applications.

The operation of unit can also be understood from FIG. 5 which illustrates a BLUETOOTH protocol stack 100. The stack 100 includes, in order from the bottom up, the basic layers including RF layer 102, Baseband and Link Control layer 104, Link Manager Protocol Layer 106 and Logical Link Control and Adaptation Layer (L2CAP)108. The layer L2CAP 108 connects with a number of overlying layers 110 including an Internet layer 112 for providing TCP/IP protocol, a Human Interface Device layer 114 for interfacing with the user interface 130 and a RF Communications layer 116 which emulates serial ports of a PC (com1, com2 com3 etc). Each of the layers 112, 114 and 116 may connect directly with one or more applications/services 118 and are able to multiplex their output so that data is sent to the correct one of several applications/services. The layer L2CAP 108 may also connect directly to an application or service.

In the units currently proposed, the Baseband and Link Control layer 104 enables the physical RF link between units using inquiry and paging to synchronize their clocks and transmission frequencies. The Link Manager Protocol Layer 106, henceforth referred to as the Link Layer 106, is responsible for link set-up between two units including security, control of packet size, connection and power modes. In the proposal the Link Layer 106 responds to the payloads received in Link Management Protocol packets.

L2CAP allows higher level protocols to receive the payloads of received L2CAP data packets. The L2CAP protocol may be coupled to application and higher protocol layers and transfers data between either higher level protocols and services and the lower level Link Layer 106.

The payload header 37 of the payload 38 in packets 30 distinguishes L2CAP packets from Link Management Protocol packets. At present, it is required that the Link Management Protocol packets should be filtered out by the Link Layer 106 and not propagated to higher layers.

The BLUETOOTH technology should provide security measures both at the application layer and the link layer. Currently, in each BLUETOOTH unit the link layer 106 security measures are standardized. Authentication and encryption routines are implemented in a standard way in each device in the Link Layer 106.

Each unit stores one or more secret authentication link keys for use in communication with another unit or units. Typically a unit will permanently store a link key for each of the units it wishes to communicate with. Each link key is associated with the BLUETOOTH ID of the unit for which it is used to communicate.

The stored secret link key is used in an authentication routine to authenticate the identity of the unit being communicated with. The stored shared secret link key is also used to generate an encryption key. The encryption key is derived from but is different to the authentication link key and a new encryption key is generated each time encryption is used by using a random number generator.

A challenge response scheme is used to authenticate a unit. A valid pair of units share the same secret link key. A first unit produces a random number and challenges a second unit to authenticate itself by supplying the random number to it. The second unit returns the result of a function which takes as its arguments the BLUETOOTH ID of the second unit, the received random number and the key associated with the first unit but stored in the second unit. The first unit uses the same function to produce a result which if it equals the result received from the second unit authenticates the second device. The function in the first unit takes as its arguments the BLUETOOTH ID of the second unit which has been previously obtained, the random number and the key associated with the second unit but stored in the first unit.

The authentication procedure occurs in the Link Layer of each unit. Once authentication has been successfully completed access to the protocol layer, services and applications in the unit is unrestricted.

Each time encryption is required a random number is produced and an encryption key is formed from the random number and the authentication key for the link. The encryption process occurs in the Link Layer 106.

If the two devices have not previously communicated there will be no shared link key stored in the devices and it is necessary to 'pair' the devices. This may be done by inputting a PIN number into a user interface of the first unit and inputting the same PIN into a user interface of the second unit. The PINs may be used for the calculation of temporary initial authentication link keys until the calculation of a permanent shared secret authentication link key for communication between the devices.

One problem with the presently proposed security system is that it is inflexible. Once the link layer 106 has allowed a device access to the layers above it, its access is unrestricted except by specific security features built into the applications themselves. It would be desirable to provide an improved, more flexible, security system.

SUMMARY OF THE INVENTION

According to one aspect of the present invention there is provide a device for communicating with other devices to allow them to access applications, comprising: at least a first application; authentication means for authenticating a communicating device; access control means accessible by a communicating device requesting access to the first application without the communicating device having been authenticated by the authentication means, and arranged to arbitrate whether access of the communicating device to the first application is granted or refused wherein if the arbitration requires an authentication of the communicating device, the access control means instructs the authentication means to authenticate the communicating device.

According to another aspect of the present invention there is provided a device for communicating with other devices to allow them to access applications, comprising: at least first and second applications; authentication means for authenticating a communicating device; first access control means accessible by a communicating device requesting access to the first application without the communicating device having been authenticated by the authentication means, and arranged to arbitrate whether access of the communicating device to the first application is granted or refused wherein if the arbitration requires an authentication of the communicating device, the access control means instructs the authentication means to authenticate the communicating device. second access control means accessible by a communicating device requesting access to the second application without the communicating device having been authenticated by the authentication means, and arranged to arbitrate whether access of the communicating device to the second application is granted or refused wherein if the arbitration requires an authentication of the communicating device, the access control means instructs the authentication means to authenticate the communicating device, wherein the first access control means is accessible by a communicating device requesting access to the second application without the communicating device having been authenticated by the authentication means, and is arranged to provide the access of the communicating device to the second access means.

According to another aspect of the present invention there is provided a method of arbitrating the access of a requesting device to a service provided by a providing device comprising: sending a request to access the service from the requesting device to the providing device; receiving the request at the providing device and passing it, without authenticating the requesting device, to an arbitration means interfacing the service; determining, in the arbitration means, whether to grant or refuse access to the first application by the requesting device, wherein if the determination requires an authentication of the requesting device, the authentication is performed during that determination and not previously.

Embodiments of the invention provide a flexible security architecture that performs access checks when connection to a service is requested including, if necessary, authentication and encryption at the time of requesting access to application. The access control means may be a multiplexing protocol layer and the authentication means may be the link layer.

It is preferable that a device requesting access to a service is authenticated once and not many times. This may be achieved by having the request for access to a service arbitrated once-only, preferably in response to a query from the highest possible multiplexing layer (the one that directly interfaces the service).

Access to a service may be arbitrated in dependence on the security requirements of the requested service and/or the trust level of the device requesting access. The security architecture is implemented without changing the basic functions (pairing, authentication, encryption) which remain in the authentication means (link level).

According to a further aspect of the present invention there is provided a device for providing services and allowing access by other devices to the provided services, comprising: an interface for communicating with the other devices and receiving requests to access a service therefrom; arbitration means, for determining whether a requesting device communicating through the interface can access a service it has requested access to, arranged to store trust indications in association with requesting devices and arranged to receive from the interface an indication, originating from the other device, identifying the other device, wherein, if the requesting device has a stored trust indication associated therewith no user authorization is required and if the requesting device has no stored trust indication associated therewith user authorization is requirable; and a user interface for providing user authorization.

According to a further: aspect of the present invention there is provided a device for providing services and allowing access by other devices to the provided services, comprising: an interface for communicating with the other devices and receiving requests to access a service therefrom; arbitration means, for determining whether a requesting device communicating through the interface can access a service it has requested access to, arranged to store trust indications in association with requesting devices and store security indications in association with provided services and arranged to receive from the interface indications, originating from the other device, identifying the other device and the service requested, wherein, if the requesting device has a stored trust indication associated therewith no user authorization is required and if the requesting device has no stored trust indication associated therewith user authorization is required in dependence upon the stored security indication associated with the requested service; and a user interface for providing user authorization.

According to embodiments of the invention, access to services depends upon the trust level of the device which is trying to access the service. A trusted device, once its identity has been verified has access to all the services/applications. A not-trusted device may require user authorization each time it attempts to access a service. Therefore the grant of access of a not-trusted device to one service does not open up the other services to access. Separate user authorization is required to access each of the other services.

BRIEF DESCRIPTION OF THE DRAWINGS

For a better understanding of the present invention and to understand how the same may be brought into effect reference will now be made by way of example only to accompanying drawings in which:

FIGS. 7a and 7b illustrate, respectively, a service database and a device database;

DETAILED DESCRIPTION

Figure 1:
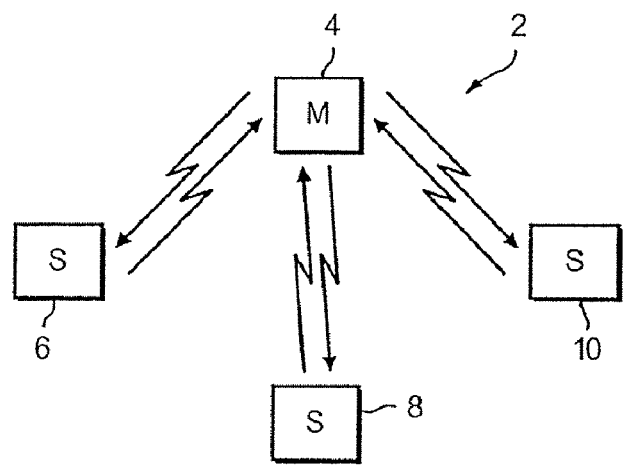
FIG. 1 illustrates a communications network including a master and slave units.
Figure 2:
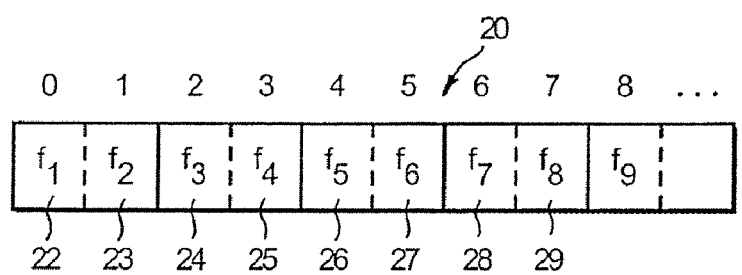
FIG. 2 illustrates the time frame of the communications network.
Figure 3:
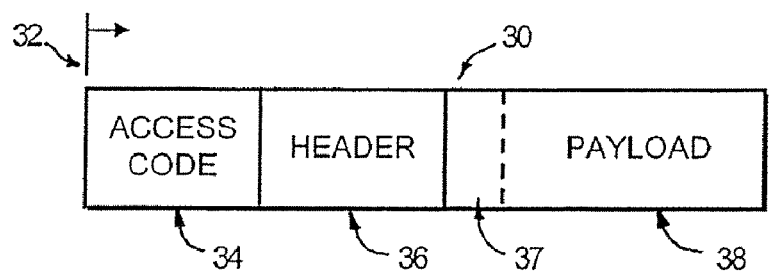
FIG. 3 illustrates a radio packet
Figure 4:
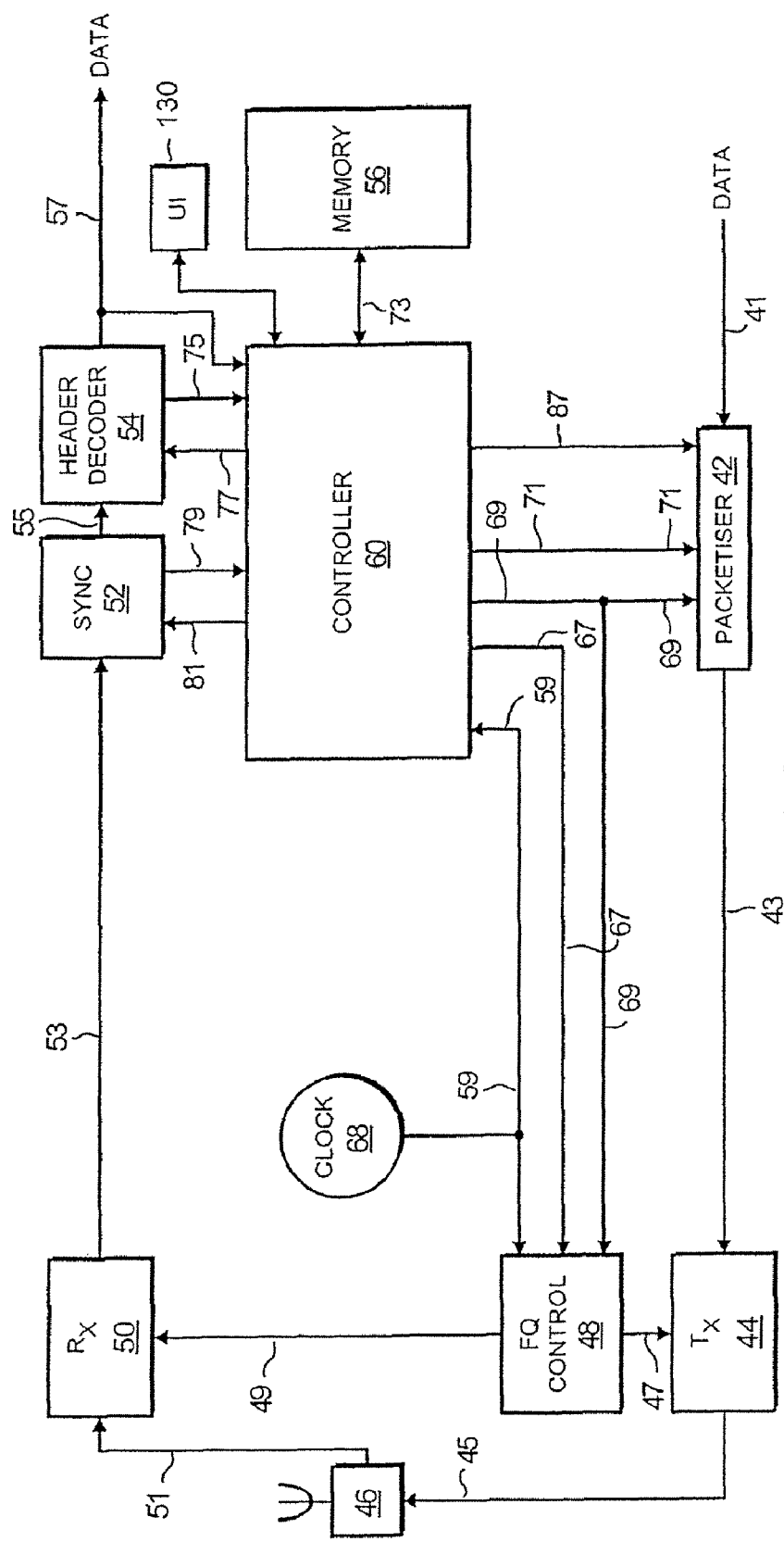
FIG. 4 illustrates a transceiver unit suitable for use as a master or slave.
Figure 5:
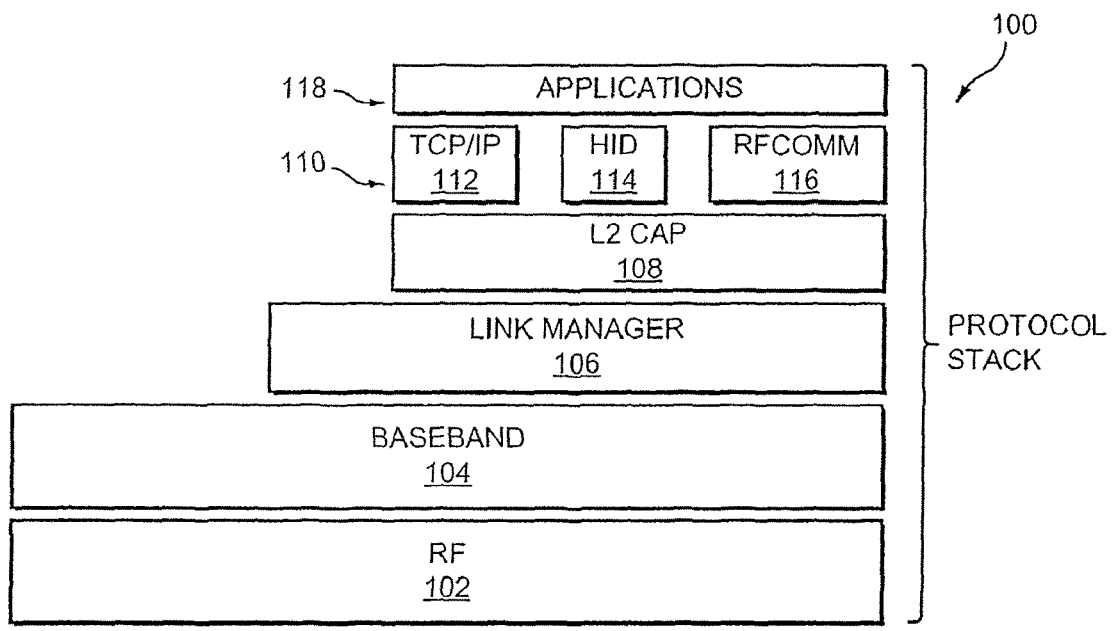
FIG. 5 illustrates a protocol stack used by a transceiver unit.
Figure 6:
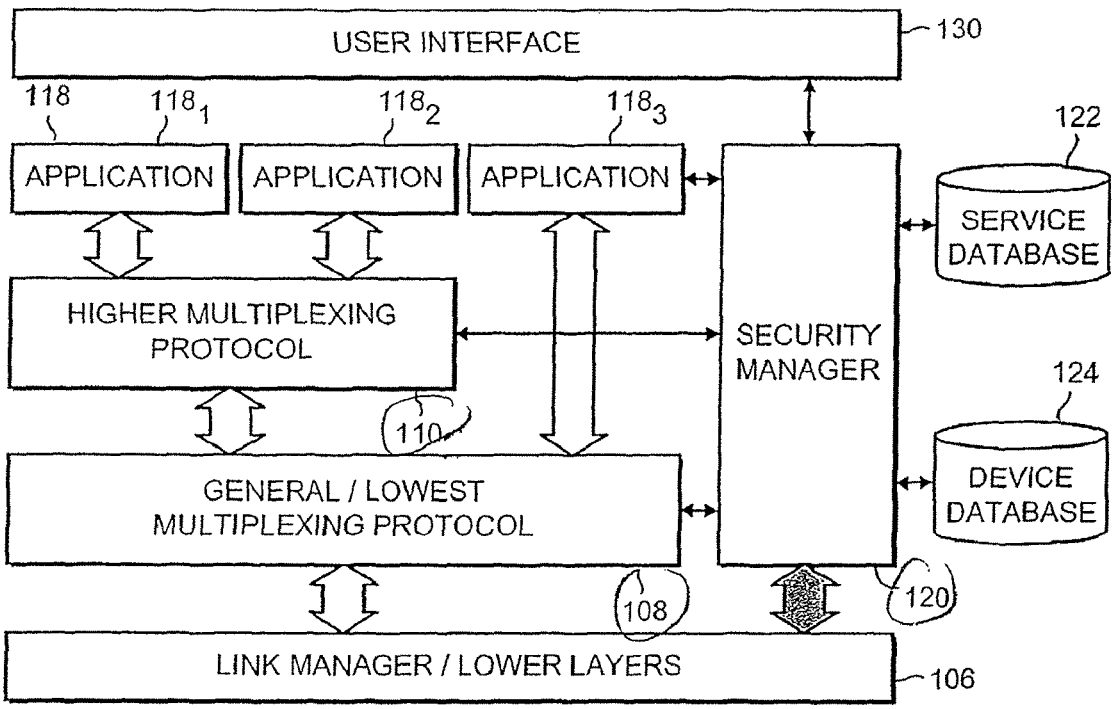
FIG. 6 illustrates a security architecture.

FIG. 6 illustrates a security architecture in accordance with one embodiment of the invention. The BLUETOOTH protocol stack 100 is illustrated. It includes lower layers including the link layer 106, a lowest multiplexing protocol layer 108 such as the L2CAP layer, a higher multiplexing protocol layer 110 such as the RFCOMM layer 116 and an application layer 118. Also illustrated are the User Interface 130, a security manager 120, a service database 122 and a device database 124.

The link layer 106 is directly connected to the lowest multiplexing protocol 108. Access to the higher multiplexing protocol 110 and the applications/services 118 from the link layer can only be achieved via the lowest multiplexing protocol layer 108.

The lowest multiplexing protocol layer 108 is directly connected to the higher multiplexing protocol 110 and also directly connected to application 1183. Access to the application 1183 can be made directly by the lowest multiplexing protocol, whereas access to applications 1181 and 1182 can only be made via the higher multiplexing protocol 110 which is directly connected to applications 1181 and 1182.

When a packet is received by a unit, the payload of the packet is passed to the lowest multiplexing protocol layer 108. The payload is not filtered by the link layer 106. If the received packet is a request to access a service/application, access to that service application is arbitrated.

The lowest multiplexing protocol layer 108 sends a query to the security manager asking whether access to a higher entity such as the higher protocol layer 110 or application 183 should be given. This query identifies the service/application to which access is required and the BLUETOOTH ID of the device requesting access. The Security Manager determines if access to the next entity should be allowed and may control the Link Layer 106 to enforce authentication. If the querying protocol layer is not directly connected to the requested service, the Security Manager automatically sends a grant signal to the querying protocol layer 108 which then allows access to a higher protocol layer 110. If the querying protocol layer 108 is directly connected to the requested service $118_3$, the Security Manager arbitrates to determine if access should be allowed. If access is allowed it sends a grant signal to the lowest multiplexing protocol layer 108 which then accesses the application $18_3$. If access is denied, the Security Manager 120 sends a refusal signal to the lowest multiplexing protocol 108 preventing access of the requesting unit to the desired service.

The request to access a service (application $118_1$ or $118_2$) received at the higher multiplexing protocol 110 from the lowest multiplexing protocol 108, causes the layer 110 to send a query to the Security Manager asking whether access to a higher entity such as a higher multiplexing protocol layer (not illustrated) or application $118_1$ or $118_2$. This query identifies the service/application to which access is required and the BLUETOOTH ID of the device requesting access. If the querying protocol layer is not directly connected to the requested service, the Security Manager automatically sends a grant signal to the querying protocol layer 108 which then allows access to a higher protocol layer. If the querying protocol layer 110 is directly connected to the requested service, the Security Manager arbitrates to determine if access should be allowed. If access is allowed it sends a grant signal to the querying protocol layer 110 which then accesses the requested application. If access is denied, the Security Manager 120 sends a refusal signal to the querying protocol layer 110 preventing access of the requesting unit to the desired service.

The lowest multiplexing protocol 108 makes an enquiry to the Security Manager for every received request for access to a service. The request is allowed to progress to a higher layer or service only if access is granted by the Security Manager. Each of the multiplexing protocol layers through which a request to access a service is routed, makes an enquiry to the Security Manager each time a request is received. The request is allowed to progress to a higher layer or service only if access is granted by the Security Manager. No application/service can therefore be accessed by a unit without at least one arbitration by the Security Manager.

The Security Manager 120 is a software module with interfaces to protocols 108 and 110, services/applications 118, the UI 130, the databases 122 and 124 and the link layer 106. The security manager controls the link layer and the performance of its standard functions such as authentication, encryption and pairing. The Security Manager knows the identity of the services each of the protocol layers has direct access to.

The Security Manager may use its interfaces to the service database 122, the device database, the link manager and the UI 130 to perform an above-mentioned arbitration. An exemplary service database is illustrated in FIG. 7a and an exemplary device database is illustrated in FIG. 7b. When the Security Manager receives a query from the protocol layers or applications it queries the databases 122 and 124. It accesses the fields associated with the requested application/service from the service database and accesses the fields associated with the BLUETOOTH ID of the requesting unit from the device database124.

The databases are used to define different security levels for devices and services. Each unit has a device database which stores information about other devices it has previously communicated with. The device database has an entry for each BLUETOOTH ID of the other devices. Each entry has associated fields including a first field to indicate whether that device is trusted or not trusted, a second field for storing the current link key for communication with that devices and a third field to indicate whether there has been a successful authentication with that device in the current session.

The trusted field is binary and there are therefore two security levels for devices-trusted and not-trusted. If a first unit records a second unit as trusted in its device database, then that second unit can access all the services of the first unit after authentication. If the first unit records the second unit as not-trusted (untrusted), the second unit may have its access to the services of the first unit restricted in dependence upon the service database in the first unit.

Each unit has a service database (FIG. 7a) which stores information about the applications and services in that unit available for access by another unit. The service database has an entry for each available application or service. Each entry has associated fields including a first field to indicate whether that service is open or not open and a second field to indicate whether encryption is required. This security information can be provided by the services/applications to the security manager during a registration procedure.

The Security Manager defines three levels of security in relation to a service. What the level is depends upon the security rating of the service (open/not-open) and the security rating of the requesting device (trusted/untrusted). When the security rating of the service is open there is no dependence upon whether the requesting device is trusted or untrusted and the open services are open to all devices.

When the security rating of the service is not-open then there is a dependence upon the trust level of the device requesting access. If the requesting device is trusted, then the device requesting access to the service must be authenticated before access to the service is granted. If the requesting device is untrusted, then the device requesting services must be authenticated and then explicit user authorization must be given before access to the service is granted.

Figure 9:
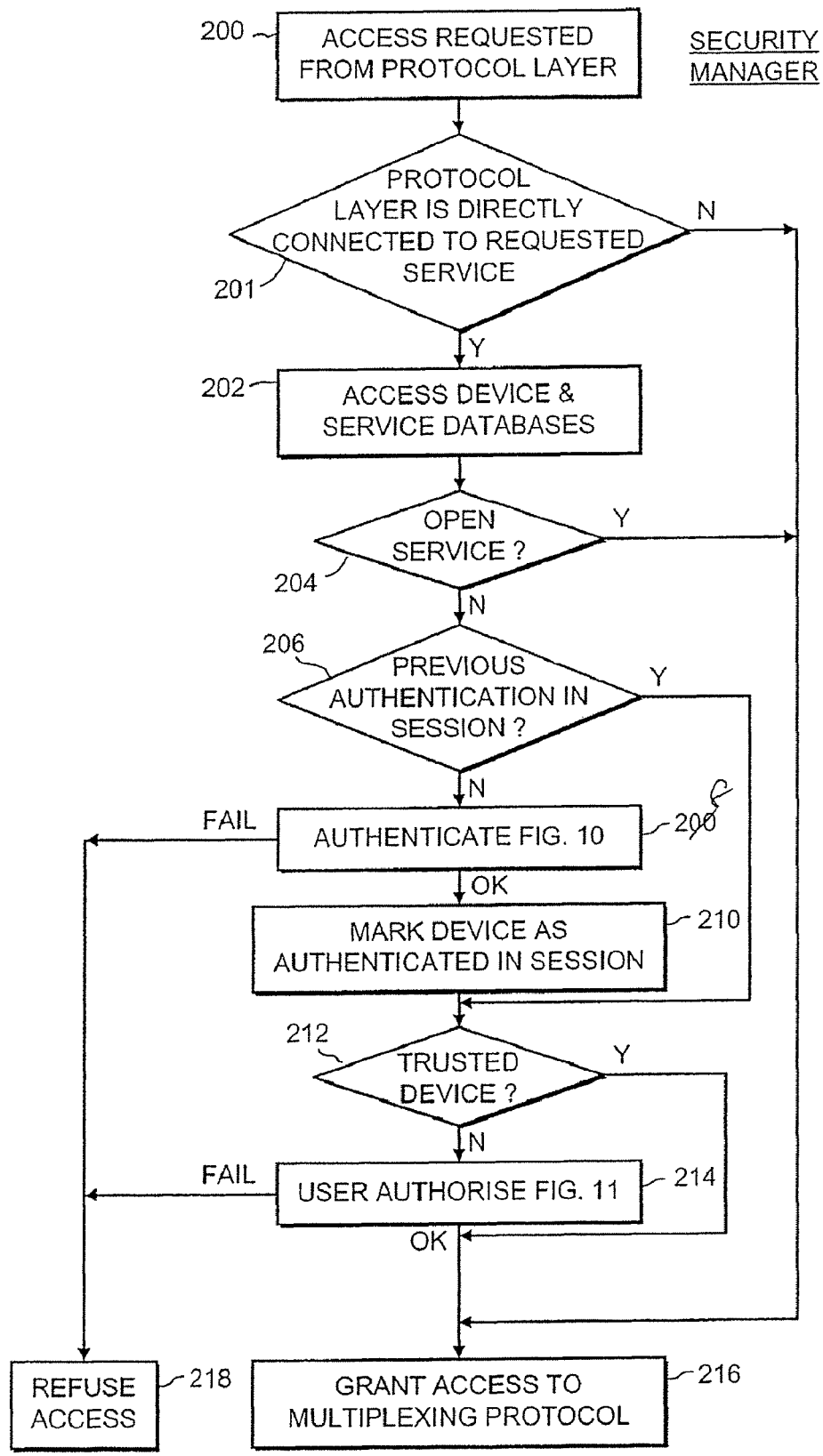
FIGS. 9 to 11 are flow diagrams illustrating the arbitration process performed by the controller to determine if a device should access a service.
Figure 10:
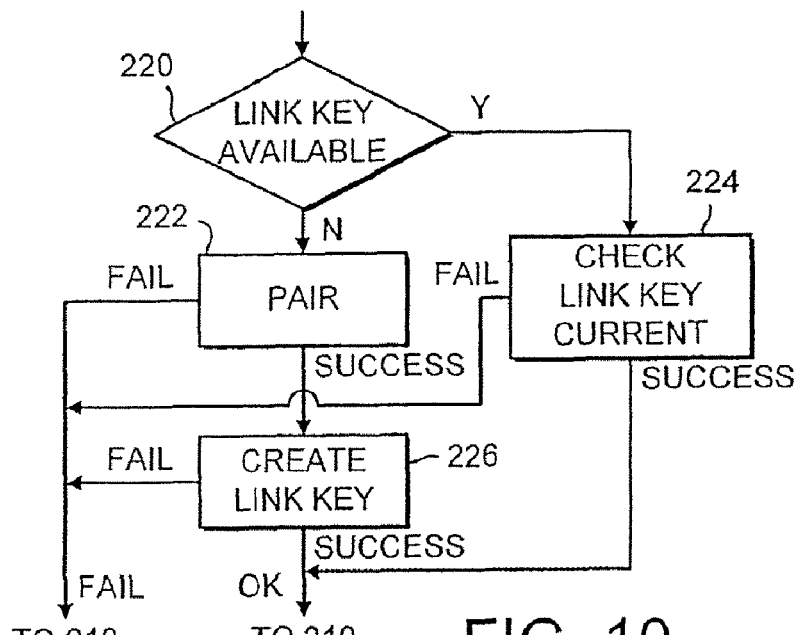
Figure 11:
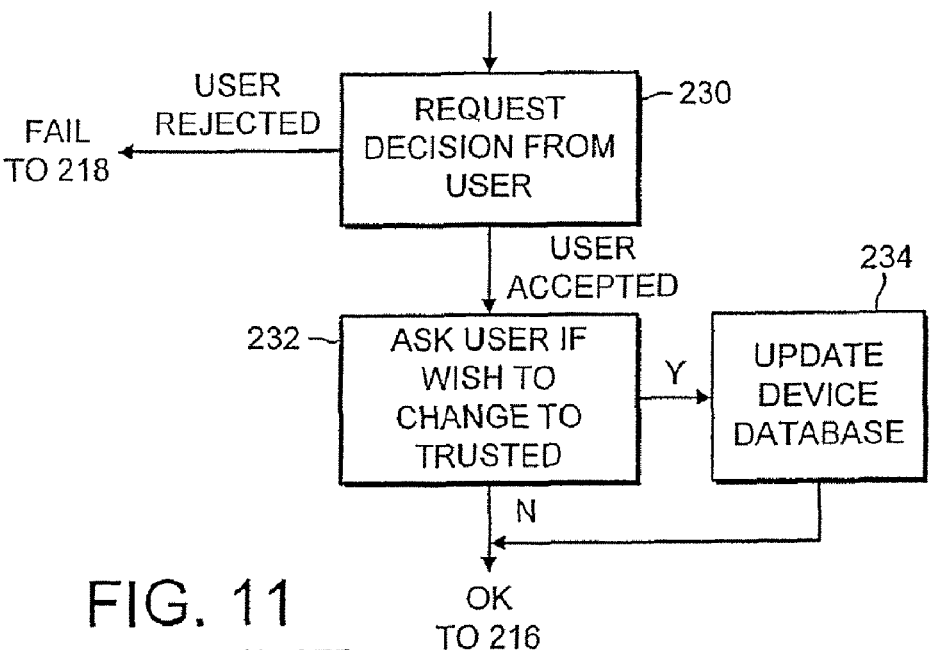

Referring to the flow diagrams in FIGS. 9 to 11, after the Security Manager receives an query (200) from the multiplexing protocol layers 108 or 110, it determines whether the querying multiplexing layer is directly connected to (interfaces with) the requested service (201). If the query from the protocol layer concerns a service to which the protocol layer is not directly connected, but is indirectly connected through higher multiplexing protocol layers, the Security Manager allows the passage of the request to the higher multiplexing protocol layer by sending a grant signal to the querying protocol layer. If the query from the querying protocol layer concerns a service to which the querying protocol layer is directly connected, the Security Manager performs an arbitration to determine if access to the service should be allowed or denied.

The arbitration is initiated by the Security Manager accessing (202) the databases 122 and 124, identifying whether the requesting device is trusted and identifying whether the requested service is open (204).

If the requested service is an open service, the Security Manager grants access (216) by sending a grant signal to the querying protocol layer which then accesses the requested application. If the requested service is not an open service the arbitration continues.

If the requesting device is trusted, authentication only is required. If authentication of the requesting device has not occurred in this session (206) (determined from the 3' field of the entry for the requesting device in the device database), then the security manager instructs the link layer 106 to perform an authentication (208). Referring to FIG. 10, the security manager provides the link layer with the current key (if any) stored in the 2nd field of the database entry. The link layer performs the authentication (with pairing if necessary) and informs the security manager if the authentication has been successful. The processes of pairing (222), checking the link key is current (224) and creating a link key are implementation dependent and are not described further. If the authentication is unsuccessful the Security Manager sends (218) a refusal signal to the querying protocol thereby preventing access to the requested service. If the authentication is successful, link layer also returns the current link key for the requesting device. The Security-Manager then updates (210) the device database, placing the current link key in the second field of the database entry and indicating that successful authentication has occurred in this session in the third field of the entry. The Security Manager then determines (212) whether the requesting device is a trusted device. As the device is trusted the Security Manager sends (216) a grant signal to the querying protocol thereby allowing access to the service.

If the requesting device is not-trusted, authentication and user authorization is required. If authentication of the requesting device has not occurred in this session (206) (determined from the $3^{rd}$ field of the entry for the requesting device in the device database), then the security manager instructs (208) the link layer 106 to perform an authentication. The security manager provides the link layer with the current key (if any) stored in the $2^{nd}$ of the database entry. The link layer performs the authentication (with pairing if necessary) as previously described in relation to FIG. 10, and informs the security manager if the authentication has been successful. If the authentication is unsuccessful the Security Manager sends (218) a refusal signal to the querying protocol thereby preventing access to the—service. If the authentication is successful the link layer also returns the current link key for the requesting device and the Security Manager updates the device database (210), placing the current link key in the second field of the database entry and indicating that successful authentication has occurred in this session in the third field of the entry. The security manager checks (212) the trusted status of the requesting device. As the device is not-trusted, the security manager then attempts to obtain user authorization (214) as illustrated in FIG. 11. The security manager controls (230) the UI 130 to indicate to the user that some positive act is required to allow a requesting device access to a service. The service and/or the requesting device may be identified on a screen. The user can agree or disagree to the access. Agreement causes the Security Manager to give (216) a grant signal to the querying protocol layer thereby allowing access to the requested service. Disagreement causes the Security Manager to give (218) a rejection signal to the enquiring protocol thereby preventing access to the requested service. The fact that user authorization has been given is not recorded and access is therefore one time only. The Security Manager, may then as an option, offer (232) the user the opportunity to change the trust status of the requesting device from untrusted to trusted with subsequent updating (234) of the device database.

If encryption is required in addition to authentication, the Security Manager controls the link layer 106 to perform it, before allowing connection to the application/service requested.

The applications/services 118 and the higher multiplexing protocol 110 must register their multiplexing policies with the Security Manager so that it can determine which application/service is directly connected to each protocol layer.

Figure 8A:
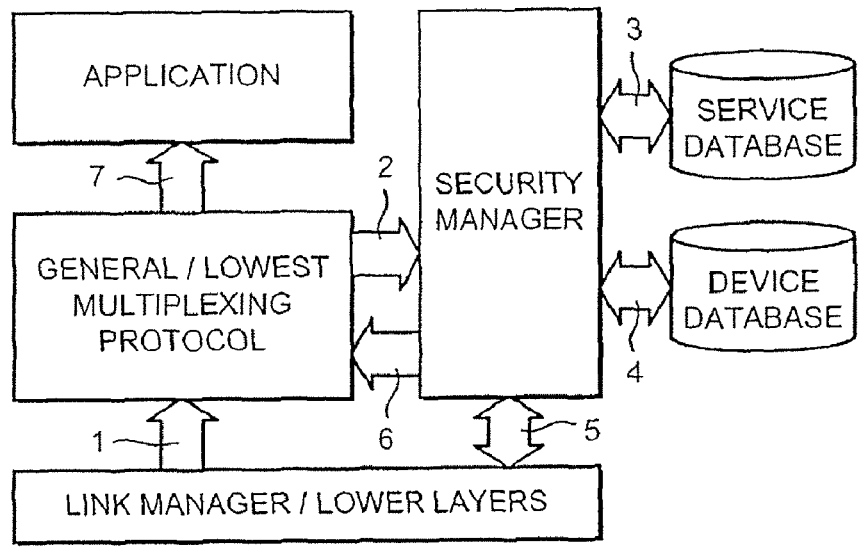
FIGS. 8a and 8b illustrate information flow in the security architecture when access for a not-open service is requested by a trusted and untrusted device respectively
Figure 8B:
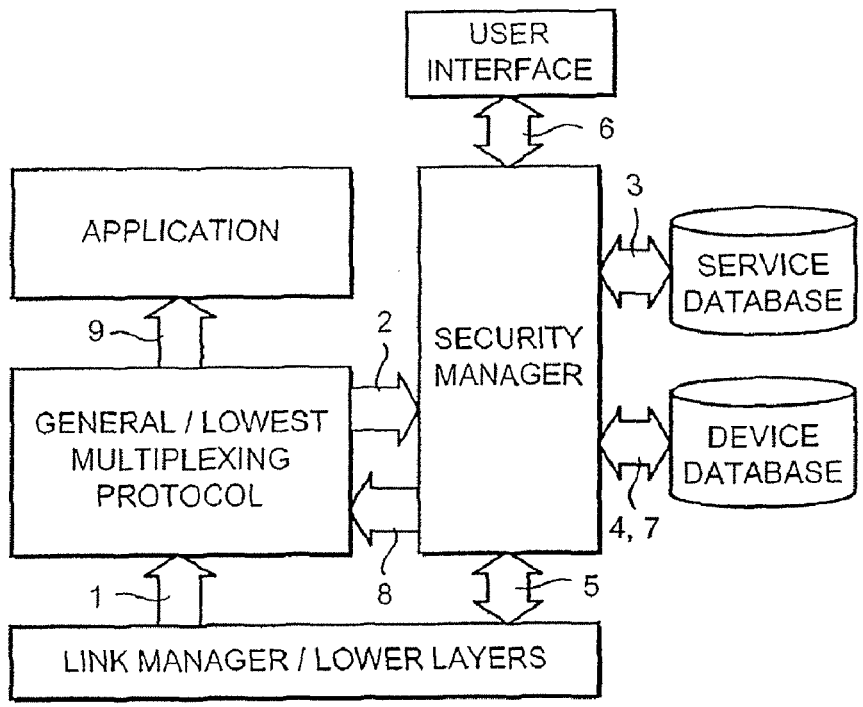

The process of accessing a service using a trusted device is further illustrated in FIG. 8*a*. The protocol layer is directly connected to a service.
1. Connect request to protocol layer
2. If access control occurs at this protocol layer, then send enquiry to Security Manager
3. Security manager looks up service database
4. Security manager looks up device database
5. Security Manager enforces standard authentication (and possibly encryption) in the link layer
6. Security Manager grants access or link terminated
7. Protocol layer continues to set up the connection by contacting higher protocol layers/services The process of accessing a service using an untrusted devices is further illustrated in FIG. 8*b*. The protocol layer is directly connected to a service.
1. Connect request to protocol layer
2. If access control occurs at this protocol layer, then send enquiry to Security Manager
3. Security manager looks up service database
4. Security manager looks up device database
5. Security Manager enforces standard authentication (and possibly encryption) in the link layer
6. Security Manager asks for manual user authorization
7. Security manager may update device database (trusted?)
8. Security Manager grants access or link terminated
9. Protocol layer continues to set up the connection by contacting higher protocol layers/services In this embodiment authentication (5) is performed before authorization (6). It would of course be possible to perform authorization (6) before authentication (5).

The preceding description describes a preferred implementation of the claimed invention in a preferred application, namely a low power radio frequency communications network in accordance with the BLUETOOTH Standard. However, it should be appreciated that other implementations and applications may be utilized without departing from the scope of the invention as claimed.

In particular, in the embodiment described, whether or not device authentication is required depends simply on the service requested and the content of the service database, in particular, whether the service is open or not-open. Whether or not user authorization is required is dependent on the service requested and the content of the service database, in particular, whether the service is open or not-open and dependent upon the identity of the device requesting access and the content of the device database, in particular, whether the requesting device is trusted or not-trusted.

It would of course be possible to make device authentication solely or additionally dependent upon the trust status of the device requesting the service. It would also be possible to make user authorization solely or additionally dependent upon the service requested so that, for example, user authorization is or is not required for a not-trusted device accessing a particular service in dependence on the stored attributes of the service.

In the above embodiments, the operation of the security architecture has been described in relation to a device requesting access to a service in the 'secure' device. The security architecture may operate in both directions so that information is not sent from the 'secure' device to another device without a decision being made by the security manager. A protocol layer, preferably the highest possible multiplexing protocol layer, and the security manager in combination arbitrate whether the information is sent or not. This arbitration may require authentication and/or authorization as described above.

While preferred embodiments of the invention have been described in detail, it will be apparent to those skilled in the art that many changes and modifications may be made without departing from the disclosed invention in its broader aspects; and it is intended that the appended claims cover all changes and modifications as fall within the true spirit and scope of the contributions made to the art hereby.

What is claimed is:

1. An apparatus comprising:
an interface configured to communicate with at least one device and to receive therefrom requests to access an application;
an arbitration component configured to
determine, before a requesting device has accessed the application, and in response to a request from the requesting device communicating through the interface, whether the requesting device can access the application,
access stored trust indications,
receive from the interface an indication, originating from the requesting device and identifying the requesting device,
grant access to the application without authorization of the requesting device if the requesting device has a stored trust indication associated therewith, and
require authorization of the requesting device before granting access to the application if the requesting device has no stored trust indication associated therewith; and
a user interface configured to provide authorization.

2. An apparatus as claimed in claim 1, wherein the arbitration component is configured to receive indications originating from the requesting device identifying the requesting device and the application.

3. An apparatus as claimed in claim 1 comprising a plurality of applications, wherein the arbitration component comprises a plurality of arbitration sub-components, and wherein each of the applications is connected to a different one of the sub-components.

4. An apparatus as claimed in claim 3 wherein the plurality of arbitration sub-components are arranged in a hierarchy, wherein a first arbitration sub-component at the lowest level in the hierarchy provides access to at least a second arbitration sub-component and access to one or both of a third arbitration sub-component and an application, wherein access to each application is provided via one or more arbitration sub-components including the first arbitration sub-component and the application's connected arbitration sub-component, if different, and wherein any arbitration sub-component is accessible by a requesting device requesting access to one of its connected applications without the requesting device having been authorized, and is arranged, with at least the second arbitration sub-component, to arbitrate whether access of the requesting device to the one connected application is granted or refused, wherein, if the requesting device has a stored trust indication associated therewith no apparatus user authorization is required and if the requesting device has no stored trust indication associated therewith apparatus user authorization is required.

5. An apparatus as claimed in claim 1 having a device database which stores trust indications of different devices.

6. An apparatus as claimed in claim 1 being portable, having a radio transceiver and wherein the user interface comprises a display and a user input device.

7. The apparatus of claim 1, wherein the arbitration component is configured to
access stored security indications associated with the application and with at least a second application, and
require apparatus user authorization before granting access to the application if the requesting device has no stored trust indication associated therewith, in dependence upon the stored security indication associated with the application indicating that apparatus user authorization is required before granting untrusted devices access to the application.

8. An apparatus claimed in claim 7 wherein the stored security indications associated with applications are indicative of whether user authorization is or is not required during arbitration, in independence of the identity of the requesting device.

9. An apparatus as claimed in claim 7 wherein the arbitration component is configured to receive indications originating from the requesting device identifying the requesting device and the application.

10. An apparatus as claimed in claim 7 comprising a plurality of applications, wherein the arbitration component comprises a plurality of arbitration sub-components, and wherein each of the applications is connected to a different one of the sub-components.

11. An apparatus as claimed in claim 10 wherein the plurality of arbitration sub-components are arranged in a hierarchy, wherein a first arbitration sub-component at the lowest level in the hierarchy provides access to at least a second arbitration sub-component and access to one or both of a third arbitration sub-component and an application, wherein access to each application is provided via one or more arbitration sub-components including the first arbitration sub-component and the application's connected arbitration sub-component, if different, and wherein any arbitration sub-component is accessible by a requesting device requesting access to one of its connected applications without the requesting device having been authorized, and is configured, with at least the second arbitration sub-component, to arbitrate whether access of the requesting device to the one connected application is granted or refused, wherein, if the requesting device has a stored trust indication associated therewith no apparatus user authorization is required and if the requesting device has no stored trust indication associated therewith apparatus user authorization is required in dependence upon the stored security indication associated with the requested application.

12. An apparatus as claimed in claim 7 having a device database which stores trust indications of different devices.

13. An apparatus as claimed in claim 7 having a service database for storing the security indications associated with the application and at least a second application.

14. An apparatus as claimed in claim 7 being portable, having a radio transceiver and wherein the user interface comprises a display and a user input device.

15. A method comprising:
storing, by an electronic device, at least one trust indication in association with at least one other device;
receiving, by the electronic device and from an interface, an indication originating from a requesting device and identifying the requesting device; and
determining, by the electronic device and before access to an application is established, whether the requesting device can access the application, the determining including determining whether there is a stored trust indication associated with the requesting device; and performing one of the following:
  granting access to the application without authorization of the requesting device based on the presence of a stored trust indication associated with the requesting device; or
  requiring authorization of the requesting device before granting access to the application based on the absence of a stored trust indication associated with the requesting device.

16. A method as claimed in claim 15, wherein the indication originating from the requesting device further identifies the application.

17. The method of claim 15, further comprising:
  storing, by the electronic device, security indications associated with the application and at least a second application, the security indication associated with the second application indicating that electronic device user authorization is not required for untrusted devices to access the second application;
  determining that electronic device user authorization is required before granting untrusted devices access to the application, and wherein the performing comprises requiring electronic device user authorization before granting access to the application based on the absence of a stored trust indication associated with the requesting device and based on the determining that electronic device user authorization is required before granting untrusted devices access to the application.

18. The apparatus of claim 1, wherein the arbitration component is configured to perform authentication before granting access to the application when there is no stored trust indication for the requesting device.

19. An apparatus comprising:
  at least one controller; and
  at least one memory having stored therein machine executable instructions, the at least one memory and stored instructions configured to, with the at least one controller, cause the apparatus to:
  determine, before a requesting device has accessed an application, and in response to a request from the requesting device communicating through an interface, whether the requesting device can access the application,
  access stored trust indications,
  receive from the interface an indication, originating from the requesting device, identifying the requesting device,
  grant access to the application without authorization of the requesting device if a stored trust indication is associated with the requesting device, and
  require authorization of the requesting device before granting access to the application if none of the stored trust indications is associated with the requesting device.

20. The apparatus of claim 19, wherein the at least one memory and stored instructions are configured to, with the at least one controller, cause the apparatus to:
  receive indications originating from the requesting device identifying the requesting device and the application.

21. The apparatus of claim 8, wherein the arbitration component is configured to
  determine, in response to a request from an untrusted device communicating through the interface and requesting access to the second application, and based on the stored security indication associated with the second application, that apparatus user authorization is not required for the untrusted device to access the second application, and
  grant the untrusted device access to the second application based on the determination that user authorization is not required for untrusted devices to access the second application.

22. The method of claim 17, further comprising:
  determining, in response to a request from an untrusted requesting device communicating through the interface and requesting access to the second application, and based on the stored security indication associated with the second application, that electronic device user authorization is not required for the untrusted device to access the second application, and
  granting the untrusted device access to the second application based on the determination that electronic device user authorization is not required.

23. The method of claim 15, wherein
  storing at least one trust indication comprises storing at least one trust indication associated with the requesting device, and
  the performing comprises granting access to the application without authorization of the requesting device based on the presence of a stored trust indication associated with the requesting device.

24. The method of claim 15, wherein the performing comprises requiring authorization of the requesting device before granting access to the application based on the absence of a stored trust indication associated with the requesting device.

* * * * *